(12) United States Patent
Noll et al.

(10) Patent No.: US 7,434,593 B2
(45) Date of Patent: Oct. 14, 2008

(54) DOUBLE CHECK VALVE ASSEMBLY

(75) Inventors: Brad L. Noll, Atascadero, CA (US);
Frank Kock, Atascadero, CA (US);
Clark Behnke, Paso Robles, CA (US);
Salvador Valdivia, Paso Robles, CA (US)

(73) Assignee: Zurn Industries, LLC, Erie, PA (US)

( * ) Notice: Subject to any disclaimer, the term of this patent is extended or adjusted under 35 U.S.C. 154(b) by 164 days.

(21) Appl. No.: 10/692,465

(22) Filed: Oct. 23, 2003

(65) Prior Publication Data

US 2004/0134537 A1 Jul. 15, 2004

Related U.S. Application Data

(60) Provisional application No. 60/420,698, filed on Oct. 23, 2002.

(51) Int. Cl.
*F16K 15/02* (2006.01)
(52) U.S. Cl. .................... 137/15.18; 137/512; 137/613; 137/454.2
(58) Field of Classification Search .......... 137/512, 137/614.2, 614.21, 454.2, 315.11, 613, 15.18
See application file for complete search history.

(56) References Cited

U.S. PATENT DOCUMENTS

| 730,463 A | 6/1903 | Keyt |
|---|---|---|
| 1,194,358 A | 8/1916 | Cecil et al. |
| 1,399,791 A | 12/1921 | Pierson |
| 1,871,536 A | 8/1932 | Le Bus |
| 1,969,432 A | 8/1934 | Smith et al. |
| 2,515,425 A | 7/1950 | Restemeier |
| 2,556,277 A | 6/1951 | Hill et al. |
| 2,626,124 A | 1/1953 | McCarthy |
| 2,630,294 A | 3/1953 | Ericson et al. |
| 2,748,788 A | 6/1956 | Duckstein |
| 2,770,314 A | 11/1956 | Powell |
| 2,842,150 A | 7/1958 | Olson |
| 2,845,085 A | 7/1958 | Robbins |
| 3,026,902 A | 3/1962 | Ruhl, Jr. |
| 3,060,961 A | 10/1962 | Conley |
| 3,245,257 A | 4/1966 | Anderson |
| 3,259,144 A | 7/1966 | Taplin |
| 3,276,465 A | 10/1966 | Wyckoff |
| 3,283,772 A | 11/1966 | Ensign |
| 3,294,115 A | 12/1966 | Koenigsberg et al. |
| 3,313,458 A | 4/1967 | Braun |
| 3,422,841 A | 1/1969 | Farrer |
| 3,478,778 A | 11/1969 | Curtiss et al. |
| 3,482,603 A | 12/1969 | Outcalt |
| 3,604,453 A | 9/1971 | Boitnott |
| 3,789,874 A | 2/1974 | Hills |
| 3,817,273 A | 6/1974 | Erwin, Jr. |

(Continued)

FOREIGN PATENT DOCUMENTS

GB    1194358    6/1970

(Continued)

*Primary Examiner*—Kevin L Lee
(74) *Attorney, Agent, or Firm*—The Webb Law Firm (57) ABSTRACT

A double check valve that generally includes a modular fluid casing having a main housing, a one-piece modular cage, and at least one in-line check valve removably housed in the modular cage.

30 Claims, 5 Drawing Sheets

U.S. PATENT DOCUMENTS

| | | | |
|---|---|---|---|
| 3,817,278 A | 6/1974 | Elliott | |
| 3,857,408 A | 12/1974 | Rhodes et al. | |
| 3,870,071 A | 3/1975 | Graham et al. | |
| 3,946,754 A | 3/1976 | Cook | |
| 3,974,848 A | 8/1976 | Wheatley | |
| 3,974,854 A | 8/1976 | Kurpanek | |
| 3,996,962 A | 12/1976 | Sutherland | |
| 4,019,532 A | 4/1977 | Schittek | |
| 4,067,356 A | 1/1978 | Kreuz | |
| 4,141,381 A | 2/1979 | Eminger | |
| 4,188,973 A * | 2/1980 | Weise et al. | 137/514 |
| 4,232,704 A | 11/1980 | Becker et al. | |
| 4,249,563 A | 2/1981 | Shaw | |
| 4,259,983 A * | 4/1981 | Kessel | 137/512 |
| 4,270,559 A | 6/1981 | Wallberg | |
| 4,284,097 A | 8/1981 | Becker et al. | |
| 4,313,462 A | 2/1982 | Adamson | |
| 4,327,760 A | 5/1982 | Lancaster | |
| 4,332,271 A | 6/1982 | Rohr | |
| 4,437,486 A * | 3/1984 | Bianchi | 137/315.11 |
| 4,460,012 A | 7/1984 | Koumi et al. | |
| 4,552,174 A | 11/1985 | Carl et al. | |
| 4,562,860 A | 1/1986 | Walter et al. | |
| 4,566,489 A | 1/1986 | Knapp et al. | |
| 4,569,636 A | 2/1986 | Bauer et al. | |
| 4,576,234 A | 3/1986 | Upchurch | |
| 4,587,990 A * | 5/1986 | Pennell et al. | 137/454.2 |
| 4,669,500 A | 6/1987 | Strelow | |
| 4,706,706 A | 11/1987 | Page et al. | |
| 4,874,012 A | 10/1989 | Velie | |
| 4,893,654 A | 1/1990 | Feuz | |
| 4,917,141 A | 4/1990 | Brunel et al. | |
| 4,989,635 A | 2/1991 | Dunmire | |
| 5,046,525 A | 9/1991 | Powell | |
| 5,072,753 A | 12/1991 | Ackroyd | |
| 5,135,019 A | 8/1992 | Dupont | |
| 5,146,949 A | 9/1992 | Retzloff et al. | |
| 5,148,828 A | 9/1992 | Farnham | |
| 5,152,502 A | 10/1992 | Randall et al. | |
| 5,156,183 A | 10/1992 | Scaramucci | |
| 5,203,365 A | 4/1993 | Velie | |
| 5,207,242 A | 5/1993 | Daghe et al. | |
| 5,236,009 A | 8/1993 | Ackroyd | |
| 5,327,933 A | 7/1994 | Ishikawa et al. | |
| 5,360,032 A | 11/1994 | Schenk | |
| 5,392,803 A | 2/1995 | Bruce | |
| 5,439,028 A | 8/1995 | Meyer et al. | |
| 5,503,176 A | 4/1996 | Dunmire et al. | |
| 5,511,574 A | 4/1996 | Macke | |
| 5,524,663 A | 6/1996 | Walsh et al. | |
| 5,546,977 A | 8/1996 | Chaney | |
| 5,584,315 A | 12/1996 | Powell | |
| 5,711,341 A | 1/1998 | Funderburk et al. | |
| 5,732,744 A | 3/1998 | Barr et al. | |
| 5,785,077 A | 7/1998 | Rice | |
| 5,794,655 A | 8/1998 | Funderburk et al. | |
| 5,799,928 A | 9/1998 | Siver | |
| 5,947,152 A | 9/1999 | Martin et al. | |
| 6,039,069 A | 3/2000 | Gonsior | |
| 6,050,293 A | 4/2000 | Lin et al. | |
| 6,220,282 B1 | 4/2001 | Powell | |
| 6,302,132 B1 | 10/2001 | Lay | |
| 6,325,090 B1 | 12/2001 | Horne et al. | |
| 6,581,626 B2 * | 6/2003 | Noll et al. | 137/315.11 |
| 6,679,289 B2 * | 1/2004 | Sisk | 137/527.2 |

FOREIGN PATENT DOCUMENTS

| | | | |
|---|---|---|---|
| JP | 64-21287 | | 7/1987 |
| JP | 63-30667 | | 2/1988 |
| WO | WO 00/70246 | * | 11/2000 |

* cited by examiner

DOUBLE CHECK VALVE ASSEMBLY

CROSS REFERENCE TO RELATED APPLICATION

This application claims the benefit of U.S. Provisional Patent Application No. 60/420,698, filed Oct. 23, 2002, entitled "Double Check Valve Assembly" which is hereby incorporated by reference in its entirety.

BACKGROUND OF THE INVENTION

1. Field of the Invention

The present invention relates to check valve assemblies and, more particularly, to a modular fluid casing for a check valve.

2. Description of Related Art

Fluid valves generally include a main body having two ends. The main body also forms an internal flow cavity that fluidly connects the two ends and houses internal valves. In a typical installation, one end of the main body is connected to a fluid inlet pipe and the other end is connected to a fluid outlet pipe. Fluid flows from the fluid inlet pipe, through the internal flow cavity, is stopped, directed, or left unimpeded by the internal valves, and exits through the fluid outlet pipe. Such fluid valves can include backflow prevention valves (i.e., double check and reduced pressure principle valves).

Some fluid valves have movable parts, such as independently acting internal reciprocating check valves, positioned in the internal flow cavity formed by a main body. An inlet shutoff valve, or some other member, as shown in U.S. Pat. Nos. 1,969,432; 3,245,257; 3,946,754; 4,327,760; 5,392,803; 5,511,574; and 5,732,744, is typically positioned adjacent one end of the main body and an outlet shutoff valve is positioned adjacent the other end of the main body. In turn, each shutoff valve is connected, respectively, to the fluid inlet pipe or the fluid outlet pipe. The shutoff valves are required for testing and service of the backflow prevention valve.

The repair, inspection, or replacement of such check valves typically requires the flow of fluid to be shut off at the valve inlet and outlet, thus stopping the flow of fluid through the pipe. Access to internal components of such check valves are typically accomplished through one or more access ports or openings. Under certain regulatory codes, the main body which houses the fluid valves cannot be completely removed from the fluid handling system during routine maintenance and inspection of the valves. Therefore, maintenance and inspection of such valves can become difficult when the main body is in a location that is not easily accessible to maintenance personnel.

In some fluid handling installations, a bypass line is often used to maintain fluid flow through the system while the other fluid valves are either being repaired or replaced. This bypass line adds additional costs and takes up extra space in the fluid handling installation. In some installations, a minor disruption in the fluid flow may not result in serious adverse consequences downline of the fluid handling installation. Therefore, if the time of repair, replacement, or inspection of a fluid valve can be minimized, the need for an additional bypass line may not be required.

Therefore, it is an object of the present invention to overcome the above-mentioned deficiencies by providing a modular fluid casing for a check valve that provides for easy maintenance and replacement of check valves with minimal disruption of the flow in a fluid handling installation.

SUMMARY OF THE INVENTION

The present invention provides for a modular fluid casing that includes a housing and a modular cage. The housing has an inlet end and an outlet end and defines a flow channel therebetween. The flow channel is in fluid communication with the inlet end and the outlet end of the housing. The modular cage having a first open end and a second open end and defining an interior cavity is received within the flow channel of the housing. The interior cavity of the modular cage is adapted to be in fluid communication with the inlet end and the outlet end of the housing. The interior cavity of the modular cage is also adapted to receive at least one check valve.

The present invention also provides for a check valve arrangement that includes the modular fluid casing having the modular cage and the housing as previously discussed, wherein the modular cage is removably seated within the flow channel of the housing. A plurality of check valves are removably seated within the interior cavity of the modular cage, wherein the check valves are in fluid communication with the inlet end and the outlet end of the housing. The interior cavity may define a first diameter portion and a second diameter portion, wherein a diameter of the first diameter portion and a diameter of the second diameter portion are different. A lip can separate the first diameter portion from the second diameter portion of the interior cavity of the modular cage. Alternatively, the first diameter portion and the second diameter portion of the interior cavity can have the same diameter.

The present invention provides for a method of installing check valves in line with respect to a fluid conduit using a modular casing as previously discussed. The method includes inserting at least one check valve into the interior cavity of the modular cage. Second, the modular cage is inserted into the flow channel of the housing. Third, the modular cage is secured to the housing. Fourth, the modular casing is installed in line with respect to a fluid conduit.

DETAILED DESCRIPTION OF THE INVENTION

Figure 1:
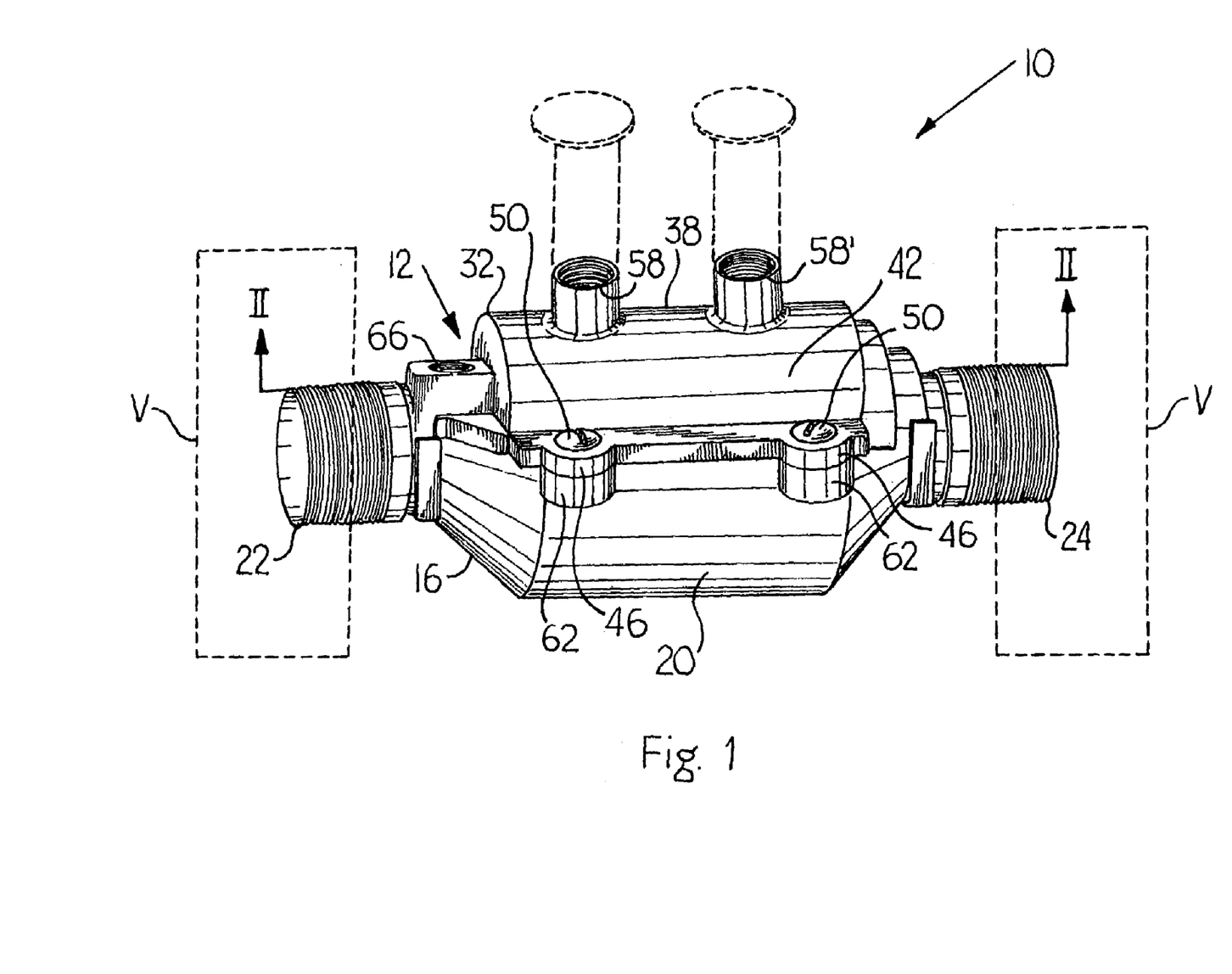
FIG. 1 is a top perspective view of a check valve arrangement made in accordance with the present invention.
Figure 2:
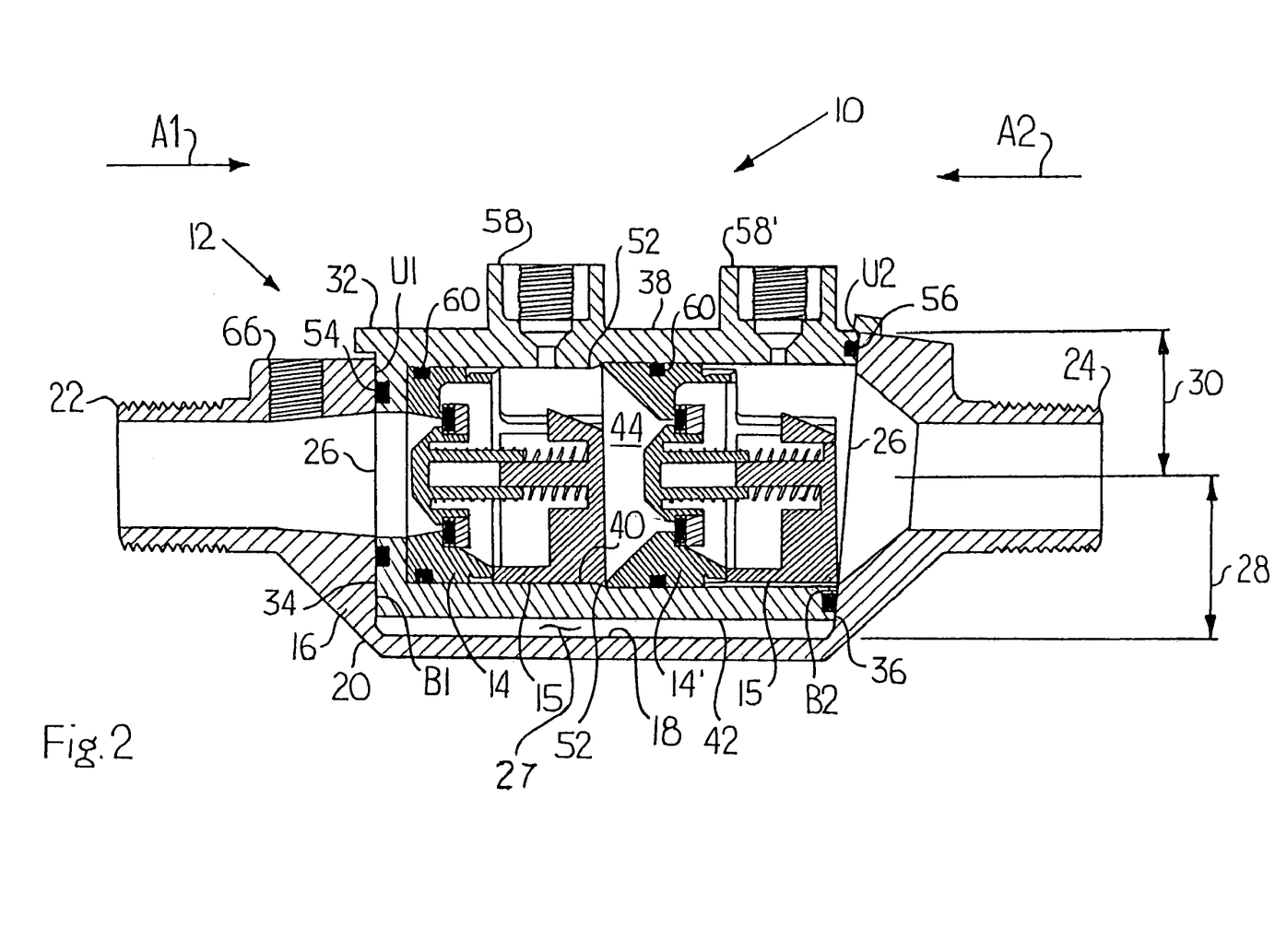
FIG. 2 is a side sectional view taken along lines II-II of the check valve arrangement shown in FIG. 1.
Figure 3:
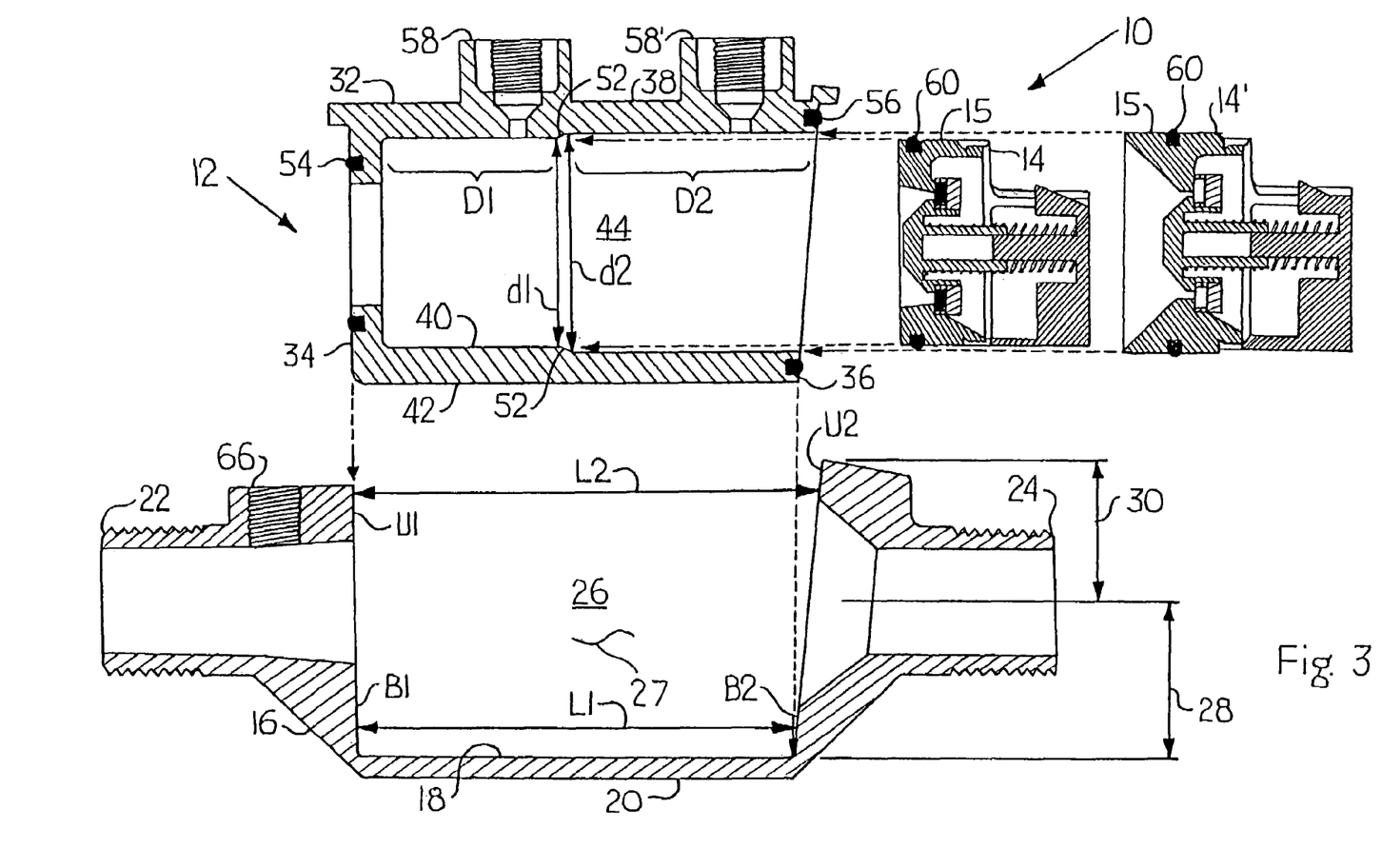
FIG. 3 is an exploded sectional view of the check valve arrangement shown in FIG. 2.

FIG. 1 shows a check valve arrangement 10 made in accordance with the present invention. The arrangement 10 includes a modular fluid casing 12 having one or more in-line check valves (and preferably two check valves 14, 14' as shown in FIG. 2) received within the modular casing 12. Referring to FIGS. 2 and 3, the modular casing 12 includes a housing or receiving member 16 having an inner surface 18 and an outer surface 20 and a one-piece modular cage 32 having a first open end 34 and a second open end 36 removably seated within the housing 16. The housing 16 includes an inlet end 22 and an outlet end 24, wherein the inner surface 18 defines a flow channel 26 or modular cage receiving area 27 between the inlet end 22 and the outlet end 24 of the housing 16. The flow channel 26 is in fluid communication with the inlet end 22 and outlet end 24 of the housing 16 as shown in FIG. 3. The modular cage 32 includes a body 38 having an interior surface 40 and an exterior surface 42, wherein the interior surface 40 defines an interior cavity 44 between the first open end 34 and the second open end 36 of the body 38 of the modular cage 32. Referring to FIG. 2, the interior cavity 44 of the modular cage 32 is adapted to be in fluid communication with the inlet end 22 and the outlet end 24 of the housing 16. The interior cavity 44 of the modular cage 32 is also adapted to receive the in-line check valves 14 and 14' via the second open end 36 of the modular cage 32. The check valves 14,14' have outer surfaces 15 as shown in FIG. 3. The in-line check valves 14,14' are similar to those shown and described in U.S. Pat. No. 6,513,543 to Noll et al., which is hereby incorporated by reference. The modular fluid casing 12 can be geometric shaped, such as tubular shaped, rectangular shaped, hexagonal shaped, or other polygonal shaped, and can be made of metal or a polymeric material, such as plastic.

Figure 4:
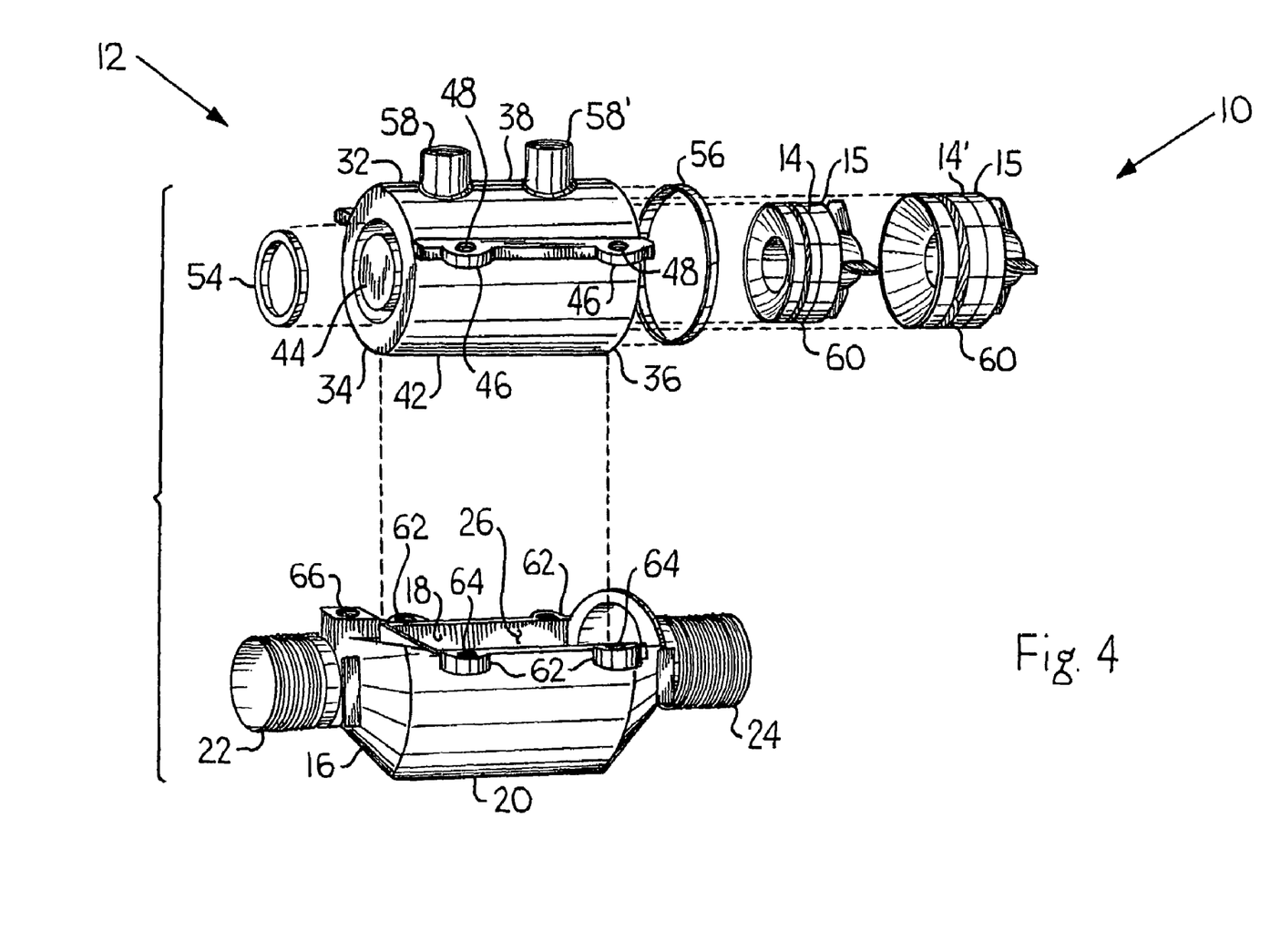
FIG. 4 is an exploded view of the check valve arrangement shown in FIG. 1.

FIG. 2 shows the check valve arrangement 10, wherein the modular cage 32 is removably seated within the flow channel 26 or modular cage receiving area 27 of the housing 16. Referring to FIGS. 1 and 4, the modular cage 32 includes a plurality of protrusions 46 extending outwardly from the exterior surface 42 of the body 38 of the modular cage 32. Two of the protrusions 46 are defined on one side of the body 38 of the modular cage 32 and two of the protrusions 46 (not shown) are defined on an opposite side of the body 38 of the modular cage 32. Referring to FIG. 4, a slot or hole 48 is defined in each protrusion 46, wherein the slot 48 is adapted to receive a fastener 50 (shown in FIG. 1) for securing the modular cage 32 to the housing 16. Referring to FIG. 3, a lip 52 is defined on the interior surface 40 of the interior cavity 44 of the body 38 of the modular cage 32, wherein a first diameter portion D1 of the interior cavity 44 adjacent the first open end 34 has a diameter $d_1$ less than a diameter $d_2$ of a second diameter portion D2 of the interior cavity 44 adjacent the second open end 36 of the modular cage 32. The lip 52 separates the first diameter portion D1 from the second diameter portion D2. The first diameter portion D1 of the interior cavity 44 separately and independently holds check valve 14 in place as shown in FIG. 2. Alternatively, the lip 52 can be removed, wherein the diameter $d_1$ of the first diameter portion D1 is the same as diameter $d_2$ of the second diameter portion D2.

Referring to FIGS. 3 and 4, the modular cage 32 can include a first gasket 54 positioned adjacent the first open end 34 and a second gasket 56 positioned adjacent the second open end 36 of the modular cage 32. The gaskets 54, 56 are adapted to provide a seal between the interior cavity 44 of the body 38 of the modular cage 32 and the inlet end 22 and outlet end 24 of the housing 16. Alternatively, any type of sealing arrangement can be used, such as an arrangement having one fluid seal or a plurality of fluid seals. The gaskets 54, 56 which can be made of an elastomeric material, such as rubber, can be annular shaped, such as O-rings (shown in FIG. 4), or flat gaskets (not shown). At least one tap 58 (and preferably two taps 58, 58' as shown in FIG. 4) extend from the exterior surface 42 of the body 38 of the modular cage 32. The taps 58, 58' are in fluid communication with the interior cavity 44 of the modular cage 32. Preferably, the body 38 of the modular cage 32 includes one tap 58 or 58' for each check valve 14, 14' removably seated within the interior cavity 44 of the modular cage 32. The taps 58, 58' can be internally threaded for attaching additional components, such as pressure gauges and flow gauges, to the check valve arrangement 10, as shown in phantom in FIG. 1. The plurality of check valves 14, 14' can be removably seated within the interior cavity 44 of the body 38 of the modular cage 32, wherein a valve gasket 60 (shown in FIGS. 2 and 3) can be positioned on the outer surfaces 15 of each check valve 14, 14'. When the check valves 14, 14' are received within the interior cavity 44 of the body 38 of the modular cage 32 as shown in FIG. 2, the gaskets 60 are compressed against the interior surface 40 of the interior cavity 44 and the outer surfaces 15 of the check valves 14, 14', thus sealing the check valves 14, 14' within the interior cavity 44 of the body 38 of the modular cage 32.

Referring to FIGS. 1 and 4, the housing 16 defines a plurality of lugs 62 extending outwardly from the outer surface 20 of the housing 16. Referring to FIG. 4, two of the lugs 62 are defined on one side of the housing 16 and two of the lugs 62 (not shown) are defined on an opposite side of the housing 16. Each lug 62 defines an orifice 64 also adapted to receive fastener 50. The slot 48 defined in the protrusions 46 of the modular cage 32 aligns with the orifice 64 defined in the lug 62 of the housing 16, wherein the fastener 50 passes through the orifice 64 and the slot 48, thus securing the modular cage 32 to the housing 16 as shown in FIG. 1. The fastener 50 can be a threaded fastener and the orifice 64 or the slot 48 can have internal threads for removably securing the housing 16 to the modular cage 32. A tap 66 similar to taps 58, 58' can be defined in the housing 16 adjacent the inlet end 22 and in fluid communication with the inlet end 22 and the outlet end 24 of the housing 16 as shown in FIGS. 2 and 3.

Figure 5:
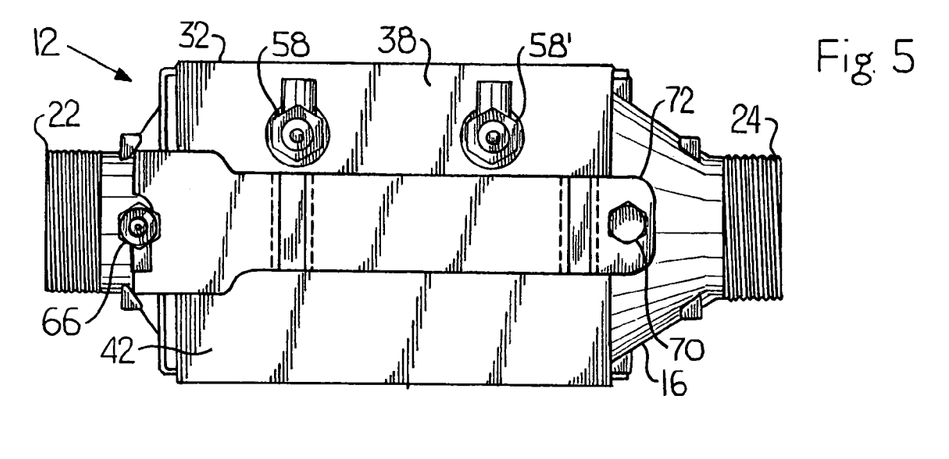
FIG. 5 is a top plan view of a check valve arrangement made in accordance with a second embodiment of the present invention.
Figure 6:
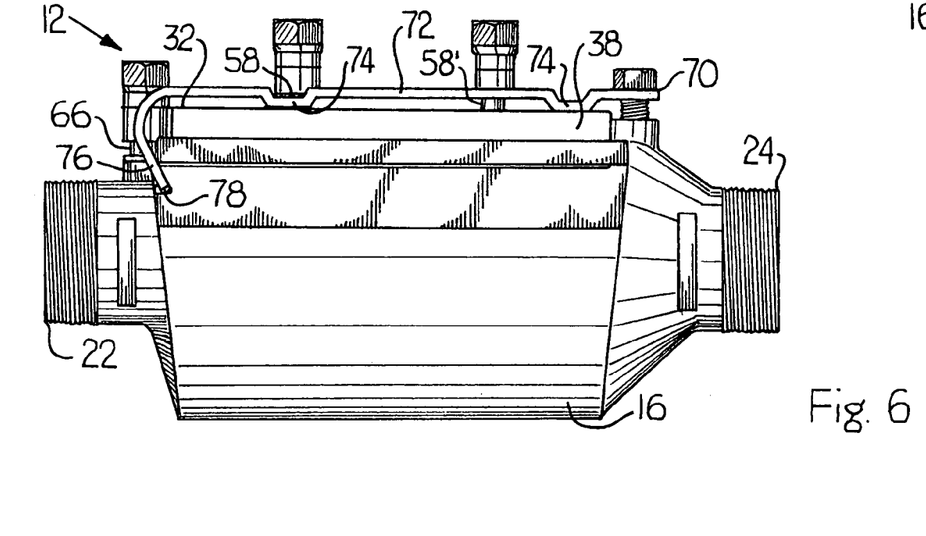
FIG. 6 is a side elevational view of the check valve arrangement shown in FIG. 5.
Figure 7:
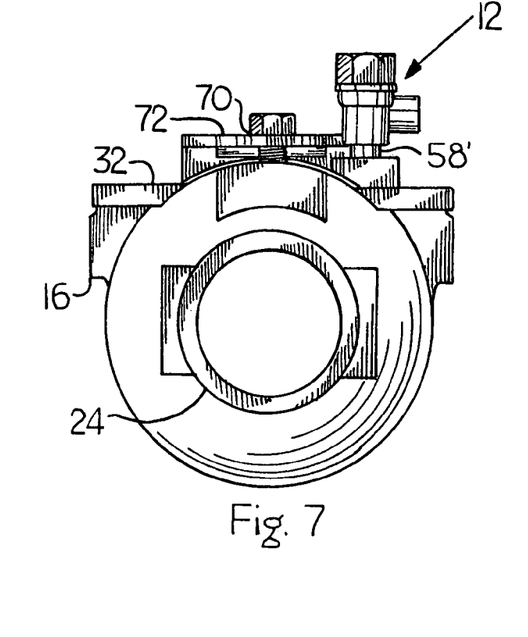
FIG. 7 is a back elevational view of the check valve arrangement shown in FIG. 5.

Alternatively, the modular cage 32 can be removably secured to the housing 16 via a bolt or retainer 70 attached to an external clamp 72 as shown in FIGS. 5-7, or by using other types of fastening arrangements. Specifically, the clamp 72 includes a first end defining a hole through which the bolt 70 passes. The bolt 70 is threadably secured to the housing 16 via a threaded hole defined in the housing 16. The clamp 72 includes two legs 74 adapted to contact a surface (preferably an upper surface) of the modular fluid casing 12. The clamp 72 is preferably a unitary piece of stamped metal. A hook portion 76 is defined on a second end of the clamp 72 opposite the hole for the bolt 70. The hook portion 76 is adapted to engage in a recess 78 defined in the housing 16. In operation, the hook portion 76 is placed in the recess 78 so that the legs 74 contact the upper surface of the modular fluid casing 12. The bolt 70 passes through the hole defined in the clamp 72 and is threadably secured to the housing 16. The bolt 70 is tightened to secure the modular cage 32 to the housing 16. The above process is reversed to remove the modular cage 32 from the housing 16.

Referring to FIGS. 2 and 3, the flow channel 26 or modular cage receiving area 27 of the housing 16 includes a bottom portion 28 having walls B1 and B2 and a upper portion 30 having walls U1 and U2, wherein a length L1 of the bottom portion 28 between walls B1 and B2 is less than a length L2 between walls U1 and U2 of the upper portion 30 of the flow channel 26 or modular cage receiving area 27 of the housing 16. When the modular cage 32 is received within the flow channel 26 or modular cage receiving area 27 of the housing 16 as shown in Fig. 2, the gaskets 54, 56 are compressed against the exterior surface 42 of the body 38 of the modular cage 32 and the walls B1, B2, U1, and U2 on the inner surface 18 of the housing 16. A wedged arrangement is formed between the second open end 36 of the body 38 of the modular cage 32 and the inner surface 18 of walls B2 and U2 defined within the flow channel 26 or modular cage receiving area 27 adjacent the outlet end 24 of the housing 16. thus sealing the modular cage 32 within the flow channel 26 or modular cage receiving area 27 of the housing 16. Because length L1 is smaller at the bottom portion 28 of the flow channel 26 or modular cage receiving area 27, the modular cage 32 is held in place by a tight fit between exterior surface 42 of the body 38 of the modular cage 32 and the walls B1 and B2 at the bottom portion 28 of the flow channel 26 or modular cage receiving area 27. FIG. 2 shows the check valves 14' abutting against the wall B2 which is adjacent the outlet end 24 of the housing 16, thus securing the check valve 14' within the interior cavity 44 of the modular cage 32.

The present invention also provides for a method of installing check valves 14, 14' in line with respect to a fluid conduit using the modular fluid casing 12 of the present invention. Referring to FIGS. 3 and 4, check valves 14, 14' having valve gaskets 60 positioned on the outer surfaces 15 of each check valve 14, 14' are inserted through the second open end 36 into the interior cavity 44 of the modular cage 32. One check valve 14 can also be inserted into the interior cavity 44 of the modular cage 32. Gaskets 54, 56 are placed adjacent the first open end 34 and the second open end 36, respectively, of the modular cage 32. Next, the modular cage 32 is inserted into the flow channel 26 or modular cage receiving area 27 of the housing 16. The modular cage 32 and the housing 16 are secured to each other via the fastener 50 passing through the slot 48 in the protrusion 46 of the modular cage 32 and the orifice 64 in the lug 62 of the housing 16 as shown in FIG. 1. Finally, the modular fluid casing 12 is installed in line with respect to a fluid conduit (not shown) at the inlet end 22 and outlet end 24 of the housing 16. The fluid conduit, such as a pipe, can be threaded, welded, flanged, or bolted onto the inlet end 22 and the outlet end 24 of the housing 16. Typically, shut-off valves V (shown in phantom in FIG. 1) are installed at the inlet end 22 and outlet end 24 of the housing 16.

In operation, the check valves 14, 14' in the modular fluid casing 12 open when fluid flows from the inlet end 22 of the housing 16 through the check valves 14, 14' in the interior cavity 44 of the modular cage 32 and exits through the outlet end 24 of the housing 16 as indicated by arrow A1 shown in FIG. 2. Should fluid flow in an opposite direction as indicated by arrow A2, the check valves 14,14' close, thereby preventing the flow of fluid through the modular fluid casing 12.

Periodically, the check valves 14, 14' of the check valve arrangement 10 must by inspected. This can be done by loosening the fasteners 50 (shown in FIG. 1) and removing the modular cage 32 from the flow channel 26 of the housing 16. Each of the check valves 14, 14' can be removed from the interior cavity 44 of the modular cage 32 and inspected and/or replaced while the housing 16 remains in line with respect to the fluid handling installation. The check valve arrangement 10 provides for easy accessibility for the repair, inspection, or replacement of check valves 14, 14', thus minimizing down time in a fluid handling installation.

It will be readily appreciated by those skilled in the art that modifications may be made to the invention without departing from the concepts disclosed in the foregoing description. Accordingly, the particular embodiments described in detail herein are illustrative only and are not limiting to the scope of the invention, which is to be given the full breadth of the appended claims and any and all equivalents thereof.

The invention claimed is:

1. A modular fluid casing, comprising:
    a housing having an inlet end and an outlet end and defining a flow channel therebetween formed by sidewalls and a bottom wall of the housing, the flow channel in fluid communication with said inlet end and said outlet end;
    a modular cage removably secured to said housing, said modular cage having a first open end and a second open end and defining an interior cavity, said modular cage received within the flow channel of said housing, wherein the interior cavity of said modular cage is in fluid communication with said inlet end and said outlet end and said flow channel of said housing, and wherein said modular cage is a one-piece non-movable construction prior to and after placement within said housing; and
    wherein at least one check valve is seated within the interior cavity of said modular cage.

2. The modular fluid casing as claimed in claim 1, wherein said at least one check valve is removably seated within the interior cavity of said modular cage, wherein said check valve is in fluid communication with said inlet end and said outlet end of said housing.

3. The modular fluid casing as claimed in claim 2, wherein said modular cage is tubular shaped.

4. The modular fluid casing as claimed in claim 2, wherein said second open end of said modular cage is capable of receiving said check valve.

5. The modular fluid casing as claimed in claim 2, wherein at least one fluid seal is positioned between said housing and said modular cage for fluidly sealing said modular cage within the flow channel of said housing.

6. The modular fluid casing as claimed in claim 2, wherein said modular cage comprises a first gasket positioned adjacent said first open end and a second gasket positioned adjacent said second open end of said modular cage for fluidly sealing said modular cage within the flow channel of said housing.

7. The modular fluid casing as claimed in claim 2, wherein said modular cage further comprises at least one tap in fluid communication with the interior cavity.

8. The modular fluid casing as claimed in claim 2, wherein said housing defines at least one lug extending outwardly from an outer surface of said housing, said lug defining an orifice adapted to receive a fastener.

9. The modular fluid casing as claimed in claim 8, further comprising a fastener, wherein said modular cage defines at least one protrusion extending outwardly from an exterior surface of said modular cage, said protrusion having a slot aligned with the orifice of said lug of said housing, whereby said fastener passes through the orifice and the slot for securing said modular cage to said housing.

10. The modular fluid casing as claimed in claim 2, wherein said modular cage is removably secured to said housing via a retainer attached to an external clamp.

11. A check valve arrangement, comprising:
    a housing having an inlet end and an outlet end and defining a flow channel therebetween formed by sidewalls and a bottom wall of the housing, the flow channel in fluid communication with said inlet end and said outlet end;
    a modular cage removably secured to said housing, said modular cage having a first open end and a second open end removably seated within the flow channel of said housing, said modular cage defining an interior cavity, the interior cavity defining a first diameter portion and a second diameter portion, and wherein the interior cavity of said modular cage is in fluid communication with said inlet end and said outlet end and said flow channel of said housing, and wherein said modular cage is a one-piece non-movable construction prior to and after placement within said housing; and a plurality of check valves removably seated within the first diameter portion and the second diameter portion of the interior cavity of said modular cage, wherein said check valves are in fluid communication with said inlet end and said outlet end of said housing.

12. The check valve arrangement as claimed in claim 11, wherein a lip separates the first diameter portion from the second diameter portion of the interior cavity.

13. The check valve arrangement as claimed in claim 11, wherein the first diameter portion and the second diameter portion of the interior cavity of said modular cage have the same diameter.

14. The check valve arrangement as claimed in claim 11, wherein the first diameter portion has a diameter less than a diameter of the second diameter portion of the interior cavity of said modular cage.

15. The check valve arrangement as claimed in claim 11, wherein the first diameter portion of the interior cavity holds one of said check valves in place within said modular cage.

16. The check valve arrangement as claimed in claim 11, wherein at least one fluid seal is positioned between said housing and said modular cage for fluidly sealing said modular cage within said flow channel of said housing.

17. The check valve arrangement as claimed in claim 11, further comprising a first gasket positioned adjacent said first open end of said modular cage and a second gasket positioned adjacent said second open end of said modular cage, wherein said gaskets provide a fluid seal between the interior cavity of said modular cage and said inlet end and said outlet end of said housing.

18. The check valve arrangement as claimed in claim 11, further comprising a valve gasket positioned between an outer surface of each of said check valves and the interior cavity of said modular cage.

19. The check valve arrangement as claimed in claim 11, wherein said modular cage comprises at least one tap in fluid communication with the interior cavity.

20. The check valve arrangement as claimed in claim 11, wherein said modular cage comprises a tap for each check valve seated within the interior cavity of said modular cage.

21. The check valve arrangement as claimed in claim 11, wherein said modular cage is removably secured to said housing via a retainer attached to an external clamp.

22. The check valve arrangement as claimed in claim 11, further comprising a fastener removably securing said housing to said modular cage.

23. The check valve arrangement as claimed in claim 11, wherein said housing defines at least one lug extending outwardly from an outer surface of said housing, said lug having an orifice adapted to receive a fastener.

24. The check valve arrangement as claimed in claim 23, further comprising a fastener, wherein said modular cage defines at least one protrusion extending outwardly from an exterior surface of said modular cage, said protrusion having a slot aligned with the orifice of said lug of said housing, whereby said fastener passes through the orifice and the slot for securing said modular cage to said housing.

25. A modular fluid casing, comprising:
a housing having an inlet end and an outlet end and defining a flow channel therebetween, the flow channel in fluid communication with said inlet end and said outlet end; and
a modular cage removably secured to said housing, said modular cage having a first open end and a second open end and defining an interior cavity, said modular cage received within the flow channel of said housing, wherein the interior cavity of said modular cage is in fluid communication with said inlet end and said outlet end of said housing, wherein the interior cavity of said modular cage is adapted to receive at least one check valve, and wherein a wedged arrangement is formed between said second open end of said modular cage and an inner surface defined within the flow channel adjacent said outlet end of said housing, thus sealing said modular cage within the flow channel of said housing.

26. A check valve arrangement, comprising:
a housing having an inlet end and an outlet end and defining a flow channel therebetween formed by sidewalls and a bottom wall of the housing, the flow channel in fluid communication with said inlet end and said outlet end;
a modular cage removably secured to said housing, said modular cage having a first open end and a second open end removably seated within the flow channel of said housing, said modular cage defining an interior cavity, the interior cavity defining a first diameter portion and a second diameter portion, and wherein the interior cavity of said modular cage is in fluid communication with said inlet end and said outlet end and said flow channel of said housing; and
a plurality of check valves removably seated within the first diameter portion and the second diameter portion of the interior cavity of said modular cage, wherein said check valves are in fluid communication with said inlet end and said outlet end of said housing, and wherein a wedged arrangement is formed between said second open end of said modular cage and an inner surface defined within the flow channel adjacent said outlet end of said housing, thus sealing said modular cage within the flow channel of said housing.

27. A modular fluid casing, comprising:
a receiving member having an inlet end and an outlet end and defining a modular cage receiving area therebetween; and
a modular cage removably secured to said receiving member and received by the modular cage receiving area, said modular cage having a first open end and a second open end and defining an interior cavity, the interior cavity of said modular cage is in fluid communication with said inlet end and said outlet end of said receiving member, wherein the interior cavity of said modular cage is adapted to receive at least one check valve, and wherein a wedged arrangement is formed between said second open end of said modular cage and an inner surface defined within the modular cage receiving area adjacent said outlet end of said receiving member, thus sealing said modular cage within the modular cage receiving area of said receiving member.

28. A check valve arrangement, comprising:
a receiving member having an inlet end and an outlet end and defining a modular cage receiving area therebetween;
a modular cage removably secured to said receiving member and received by the modular cage receiving area, said modular cage having a first open end and a second open end and defining an interior cavity, the interior cavity defining a first diameter portion and a second diameter portion, wherein a wedged arrangement is formed between said second open end of said modular cage and an inner surface defined within the modular cage receiving area adjacent said outlet end of said receiving member, thus sealing said modular cage within the modular cage receiving area of said receiving member; and a plurality of check valves removably seated within the first diameter portion and the second diameter portion of the interior cavity of said modular cage, wherein said check valves are in fluid communication with said inlet end and said outlet end of said receiving member.

29. A method of installing check valves in line with respect to a fluid conduit using a modular fluid casing, the modular fluid casing includes a receiving member having an inlet end and an outlet end and defining a modular cage receiving area therebetween, and a modular cage having a first open end and a second open end and defining an interior cavity, wherein a wedged arrangement is formed between the second open end of the modular cage and an inner surface defined within the modular cage receiving area adjacent the outlet end of the receiving member, the method comprising:
   a. inserting at least one check valve into the interior cavity of the modular cage;
   b. inserting the modular cage into the modular cage receiving area of the receiving member;
   c. securing the modular cage to the receiving member; and
   d. installing the modular fluid casing in line with respect to a fluid conduit.

30. A method of installing check valves in line with respect to a fluid conduit using a modular fluid casing, the modular fluid casing includes a housing having an inlet end and an outlet end and defining a flow channel therebetween formed by sidewalls and a bottom wall of the housing, and a modular cage having a first open end and a second open end and defining an interior cavity, the method comprising:
   a. inserting at least one check valve into the interior cavity of the modular cage;
   b. inserting the modular cage into the flow channel of the housing whereby the interior cavity of said modular cage is in fluid communication with said inlet end and said outlet end and said flow channel of said housing;
   c. securing the modular cage to the housing; and
   d. installing the modular fluid casing in line with respect to a fluid conduit,
   wherein a wedged arrangement is formed between the second open end of the modular cage and an inner surface defined within the flow channel adjacent the outlet end of the housing, thus sealing the modular cage within the flow channel of the housing.

* * * * *